United States Patent [19]

Etzbach et al.

[11] Patent Number: 4,994,564
[45] Date of Patent: Feb. 19, 1991

[54] AZO DYES WITH A DIAZO COMPONENT OF THE 3-AMINO THIOPHENE SERIES AND A COUPLING COMPONENT OF THE PYRIDINE, PYRIDONE OR PYRAZOLE SERIES

[75] Inventors: Karl-Heinz Etzbach, Frankenthal; Helmut Reichelt, Neustadt; Guenter Hansen; Ernst Schefczik, both of Ludwigshafen; Helmut Hagen, Frankenthal; Gunther Lamm, Hassloch, all of Fed. Rep. of Germany

[73] Assignee: BASF Aktiengesellschaft, Ludwigshafen, Fed. Rep. of Germany

[21] Appl. No.: 269,646

[22] Filed: Nov. 10, 1988

[30] Foreign Application Priority Data

Nov. 12, 1987 [DE] Fed. Rep. of Germany ....... 3738374

[51] Int. Cl.$^5$ .................. C09B 29/033; C09B 29/42; D06P 3/26; D06P 3/60
[52] U.S. Cl. .................................... 534/766; 534/768; 534/769; 534/650; 534/651; 534/630; 534/765
[58] Field of Search ............... 534/766, 768, 769, 765, 534/650, 651, 630

[56] References Cited

U.S. PATENT DOCUMENTS

| | | | |
|---|---|---|---|
| 3,950,321 | 4/1976 | Dehnert et al. | 534/766 X |
| 4,042,578 | 8/1977 | Dehnert et al. | 534/766 |
| 4,055,556 | 10/1977 | Aeberli | 534/766 X |
| 4,711,954 | 12/1987 | Heidenreich et al. | 534/769 X |

FOREIGN PATENT DOCUMENTS

| | | | |
|---|---|---|---|
| 201896 | 11/1986 | European Pat. Off. | 534/766 |
| 2404854 | 8/1975 | Fed. Rep. of Germany | 534/766 |
| 2727383 | 1/1979 | Fed. Rep. of Germany | 534/766 |
| 3528759 | 2/1987 | Fed. Rep. of Germany | 534/766 |
| 3615093 | 11/1987 | Fed. Rep. of Germany | 534/766 |
| 3807774 | 9/1988 | Fed. Rep. of Germany | 534/769 |
| 3808617 | 10/1988 | Fed. Rep. of Germany | 534/769 |
| 157911 | 12/1982 | German Democratic Rep. | 534/765 |
| 2011937 | 7/1979 | United Kingdom | 534/766 |

OTHER PUBLICATIONS

Derwent Abstract of JP 60-226556 (1985).
Hellmann et al., Liebigs Ann. Chem. vol. 656 (1962), pp. 88–97.
Hartke et al., Pharm. Zentralhalle, vol. 107, (1968), pp. 348–355.
Saito et al., Synthesis 1982, pp. 1056–1059.
Heterocyclic Compounds, vol. 44, John Wiley & Sons, Inc. 1986, Thiophene and Its Derivatives, Parts 1 and 2.

Primary Examiner—Floyd D. Higel
Assistant Examiner—Fiona T. Powers
Attorney, Agent, or Firm—Oblon, Spivak, McClelland, Maier & Neustadt

[57] ABSTRACT

Thien-3-ylazo dyes of the formula:

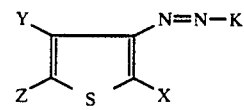

where
X is cyano, nitro, $C_1$–$C_6$-alkanoyl, substituted or unsubstituted benzoyl, substituted or unsubstituted phenyl or the radical $COOR^1$ or $CONR^1R^2$ where $R^1$ and $R^2$ are identical or different and each is independently of each other substituted or unsubstituted $C_1$–$C_8$-alkyl, $C_5$–$C_7$-cycloalkyl, $C_3$–$C_4$-alkenyl, substituted or unsubstituted phenyl or together with the nitrogen atom linking them a 5- or 6-membered saturated heterocyclic radical, and $R^2$ may additionally be hydrogen, Y is hydrogen, cyano, $C_1$–$C_6$-alkanoyl, substituted or unsubstituted benzoyl, $C_1$–$C_4$-alkylsulfonyl, substituted or unsubstituted phenylsulfonyl, substituted or unsubstituted phenyl or the radical $COOR^1$ or $CONR^1R^2$ where $R^1$ and $R^2$ are each as defined above, Z is hydrogen, substituted or unsubstituted $C_1$–$C_8$-alkyl, substituted or unsubstituted phenyl, substituted or unsubstituted $C_1$–$C_6$-alkylthio, substituted or unsubstituted phenylthio, substituted or unsubstituted $C_1$–$C_6$-alkylsulfonyl or phenylsulfonyl or together with the radical Y a fused benzo ring which may be substituted, and K is the radical of a coupling component of the 2,6-diaminopyridine, 6-hydroxypyrid-2-one or 5-aminopyrazole series, are used for dyeing synthetic fiber materials, in particular synthetic polyesters, in yellow to red shades and are notable for good light fastness, fastness to dry heat setting and pleating and for good affinity.

4 Claims, No Drawings

AZO DYES WITH A DIAZO COMPONENT OF THE 3-AMINO THIOPHENE SERIES AND A COUPLING COMPONENT OF THE PYRIDINE, PYRIDONE OR PYRAZOLE SERIES

The present invention relates to novel thien-3-ylazo dyes whose coupling components are derived from the pyridine, pyridone or pyrazole series and to the use of these dyes for dyeing synthetic fiber materials.

GB-A-2,011,937, DD-A-157,911 and JP-A-226,556/1985 disclose thien-3-ylazo dyes. Furthermore, DE-A-2,441,524 describes benzothien-3-ylazo dyes, including a case where the coupling component is 3-cyano-4-methyl-6-hydroxypyrid-2-one. However, it has been found that the known dyes have application defects.

It is an object of the present invention to provide new azo dyes whose diazo components are derived from 3-aminothiophene derivatives and which have a favorable range of application properties.

We have found that this object is achieved with novel thien-3-ylazo dyes of the formula I

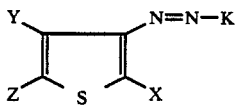

where

X is cyano, nitro, $C_1$–$C_6$-alkanoyl, substituted or unsubstituted benzoyl, substituted or unsubstituted phenyl or the radical $COOR^1$ or $CONR^1R^2$ where $R^1$ and $R^2$ are identical or different and each is independently of each other substituted or unsubstituted $C_1$–$C_8$-alkyl, $C_5$–$C_7$-cycloalkyl, $C_3$–$C_4$-alkenyl, substituted or unsubstituted phenyl or together with the nitrogen atom linking them a 5- or 6- membered saturated heterocyclic radical, and $R^2$ may additionally be hydrogen, Y is hydrogen, cyano, $C_1$–$C_6$-alkanoyl, substituted or unsubstituted benzoyl, $C_1$–$C_4$-alkylsulfonyl, substituted or unsubstituted phenylsulfonyl, substituted or unsubstituted phenyl or the radical $COOR^1$ or $CONR^1R^2$ where $R^1$ and $R^2$ are each as defined above, Z is hydrogen, substituted or unsubstituted $C_1$–$C_8$-alkyl, substituted or unsubstituted phenyl, substituted or unsubstituted $C_1$–$C_6$-alkylthio, substituted or unsubstituted phenylthio, substituted or unsubstituted $C_1$–$C_6$-alkylsulfonyl or phenylsulfonyl or together with the radical Y a fused benzo ring which may be substituted, and K is the radical of a coupling component of the pyridine, pyridone or pyrazole series.

All the alkyl groups appearing in the abovementioned formula I can be either straight-chain or branched.

If substituted phenyl radicals appear in the abovementioned formula I, suitable substituents are for example $C_1$–$C_4$-alkyl, $C_1$–$C_4$-alkoxy, cyano, fluorine, chlorine, bromine and nitro.

If substituted alkyl radicals appear in the above-mentioned formula I, suitable substituents are for example, unless otherwise stated, hydroxyl, $C_1$–$C_4$-alkoxy, phenoxy, $C_1$–$C_4$-alkoxycarbonyl, cyano and phenyl.

If in the abovementioned formula I the radicals Y and Z together are a substituted fused benzo ring, suitable substituents are for example $C_1$–$C_4$-alkyl, in particular methyl, cyano, chlorine, bromine and nitro.

If the substituents X and/or Y are each $COOR^1$ or $CONR^1R^2$, the individual radicals $R^1$ and $R^2$ are each for example hydrogen (not in the case of $R^1$), methyl, ethyl, propyl, isopropyl, butyl, isobutyl, sec-butyl, pentyl, isopentyl, neopentyl, tert-pentyl, hexyl, isohexyl, heptyl, octyl, 2-ethylhexyl, 2-hydroxyethyl, 2-hydroxypropyl, 3-hydroxypropyl, 4-hydroxybutyl, 2-methoxyethyl, 2-ethoxyethyl, 2-propoxyethyl, 2-isopropoxyethyl, 2-butoxyethyl, 3-methoxypropyl, 3-ethoxypropyl, 4-methoxybutyl, 4-ethoxybutyl, 2-phenoxyethyl, 2-phenoxypropyl, 3-phenoxypropyl, 4-phenoxybutyl, 2-methoxycarbonylethyl, 2-ethoxycarbonylethyl, 2- or 3-methoxycarbonylpropyl, 2- or 3-ethoxycarbonylpropyl, 2- or 3-butoxycarbonylpropyl, 4-methoxycarbonylbutyl, 4-ethoxycarbonylbutyl, 2-cyanoethyl, 2- or 3-cyanopropyl, 4-cyanobutyl, benzyl, 1- or 2-phenylethyl, cyclopentyl, cyclohexyl, cycloheptyl, phenyl, 2-methylphenyl, 4-methylphenyl, 4-ethylphenyl, 4-isopropylphenyl, 4-butylphenyl, 4-(2-ethylhexyl)phenyl, 2,4-dimethylphenyl, 2,4,6-trimethylphenyl, 4-cyanophenyl, 4-chlorophenyl, 2,4-dichlorophenyl, 2-bromophenyl, 3-nitrophenyl, 4-nitrophenyl, prop-2-en-1-yl, 2-methylprop-2-en-1-yl, but-2-en-1-yl or but-3-en-1-yl.

If $R^1$ and $R^2$ together with the nitrogen atom linking them are a 5- or 6-membered saturated heterocyclic radical, the possibilities are for example the following radicals: pyrrolidino, piperidino, morpholino, piperazino or N-($C_1$–$C_4$-alkyl)piperazino, such as N-methyl- or N-ethyl-piperazino.

Further radicals X and Y are for example phenyl, 4-nitrophenyl, 4-cyanophenyl, 4-methylphenyl, 4-chlorophenyl, 2,4-dichlorophenyl, formyl, acetyl, propionyl, butyryl, isobutyryl, pentanoyl, hexanoyl, benzoyl, 2methylbenzoyl, 4-methylbenzoyl, 4-ethylbenzoyl, 4-butylbenzoyl, 4-(2-ethylhexyl)benzoyl, 2,4-dimethylbenzoyl, 4-cyanobenzoyl, 4-chlorobenzoyl, 2-bromobenzoyl, 2,4-dichlorobenzoyl or 3- or 4-nitrobenzoyl.

Further radicals Y are for example methylsulfonyl, ethylsulfonyl, propylsulfonyl, isopropylsulfonyl, butylsulfonyl, isobutylsulfonyl, phenylsulfonyl, 2-methylphenylsulfonyl, 4-methylphenylsulfonyl, 4-chlorophenylsulfonyl or 4-bromophenylsulfonyl.

Radicals Z are for example methylthio, ethylthio, propylthio, isopropylthio, butylthio, isobutylthio, sec-butylthio, pentylthio, isopentylthio, neopentylthio, tert-pentylthio, hexylthio, 2-hydroxyethylthio, 2-methoxyethylthio, 2-ethoxyethylthio, 3-methoxypropylthio, 2-phenoxyethylthio, 2- or 3-phenoxypropylthio, methoxycarbonylmethylthio, ethoxycarbonylmethylthio, propoxycarbonylmethylthio, isopropoxycarbonylmethylthio, butoxycarbonylmethylthio, isobutoxycarbonylmethylthio, cyanomethylthio, benzylthio, phenylthio, 2-methylphenylthio, 4-methylphenylthio, 4-chlorophenylthio, methylsulfonyl, ethylsulfonyl, propylsulfonyl, isopropylsulfonyl, butylsulfonyl, isobutylsulfonyl, pentylsulfonyl, isopentylsulfonyl, hexylsulfonyl, 2-hydroxyethylsulfonyl, 2-methoxyethylsulfonyl, 2-ethoxyethylsulfonyl, 2-phenoxyethylsulfonyl, 2-methoxycarbonylethylsulfonyl, 2-ethoxycarbonylethylsulfonyl, 2-cyanoethylsulfonyl or benzylsulfonyl.

If Z is substituted or unsubstituted $C_1$–$C_8$-alkyl or substituted or unsubstituted phenyl, reference may be made to the radicals listed by way of example under $R^1$ and $R^2$.

If Y and Z together form a fused benzo ring which may be substituted, for example the following azo dyes

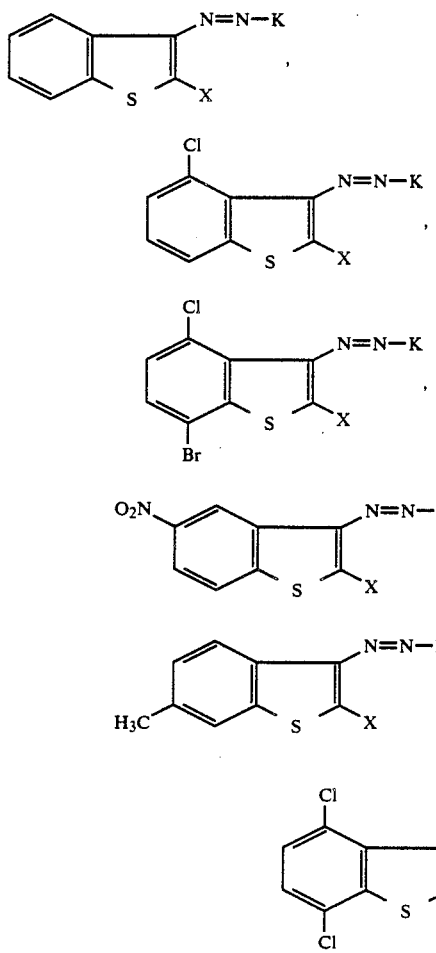

where X and K are each as defined above, come into consideration.

In the formula I, K is the radical of a coupling component KH from the pyridone, pyridine or pyrazole series. Preferably this coupling component KH comes from the 2,6-diaminopyridine, 6-hydroxypyrid-2-one or 5-aminopyrazole series.

More particularly, it conforms to formula II, III or IV

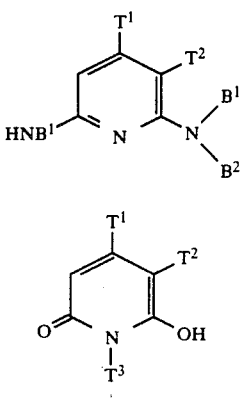

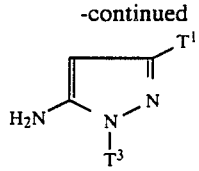

where
B¹ and B² are identical or different and each is independently of the other hydrogen, $C_1$-$C_{12}$-alkyl which is substituted and/or interrupted by one or two oxygen atoms, $C_5$-$C_7$-cycloalkyl, substituted or unsubstituted phenyl, $C_3$-$C_6$-alkenyl, substituted or unsubstituted benzoyl, $C_1$-$C_8$-alkanoyl, $C_1$-$C_6$-alkylsulfonyl or phenylsulfonyl, T¹ is hydrogen, $C_1$-$C_4$-alkyl or phenyl, T² is hydrogen, cyano, nitro, carbamoyl, $C_1$-$C_4$-monoalkyl- or -dialkyl-carbamoyl, $C_1$-$C_8$-alkanoyl, $C_1$-$C_6$-alkoxycarbonyl whose alkyl chain may be interrupted by one or two oxygen atoms, and T³ is hydrogen, $C_1$-$C_{12}$-alkyl which may be substituted and/or interrupted by one or two oxygen atoms, $C_5$-$C_7$-cycloalkyl, $C_3$-$C_6$-alkenyl or substituted or unsubstituted phenyl.

If the radicals B¹, B² and/or T³ are each substituted $C_1$-$C_{12}$-alkyl which may be interrupted by one or two oxygen atoms, suitable substituents are for example phenyl, cyano, $C_1$-$C_8$-alkoxycarbonyl, phenoxycarbonyl, halogen, in particular chlorine or bromine, hydroxyl, $C_1$-$C_8$-alkanoyloxy, benzoyloxy, $C_5$-$C_7$-cycloalkoxy and phenoxy.

Radicals T² are for example mono- or dimethylcarbamoyl, mono- or diethylcarbamoyl, mono- or dipropylcarbamoyl, mono- or diisopropylcarbamoyl, mono- or dibutylcarbamoyl, mono- or diisobutylcarbamoyl, N-methyl-N-ethylcarbamoyl, methoxycarbonyl, ethoxycarbonyl, propoxycarbonyl, isopropoxycarbonyl, butoxycarbonyl, isobutoxycarbonyl, pentyloxycarbonyl, isopentyloxycarbonyl, hexyloxycarbonyl, 2-methoxyethoxycarbonyl, 2-ethoxyethoxycarbonyl, 2-propoxyethoxycarbonyl, 2- or 3-methoxypropoxycarbonyl, 2- or 3-ethoxypropoxycarbonyl, 4-methoxybutoxycarbonyl or 4-ethoxybutoxycarbonyl.

Radicals B¹, B², T¹ and T³ are each for example methyl, ethyl, propyl, isopropyl, butyl, isobutyl or sec-butyl.

Radicals B¹, B² and T³ are each further for example, pentyl, isopentyl, neopentyl, tert-pentyl, hexyl, heptyl, octyl, 2-ethylhexyl, isooctyl, nonyl, isononyl, decyl, isodecyl, undecyl, dodecyl (the designations isooctyl, isononyl and isodecyl are trivial names and come from the alcohols obtained by the oxo process - cf. Ullmanns Enzyklopädie der technischen Chemie, 4th edition, volume 7, pages 215 to 217, and also volume 11, pages 435 and 436), 2-methoxyethyl, 2-ethoxyethyl, 2-propoxyethyl, 2-butoxyethyl, 2-(2-ethylhexyloxy)ethyl, 2-methoxypropyl, 3-methoxypropyl, 3-ethoxypropyl, 3-(2-ethylhexyloxy)propyl, 2-methoxybutyl, 4-methoxybutyl, 2-ethoxybutyl, 4-ethoxybutyl, 3,6-dioxaheptyl, 3,6-dioxaoctyl, 4,7-dioxaoctyl, 4,7-dioxanonyl, 3,6-dioxadecyl, 4,9-dioxatridecyl, benzyl, 1- or 2-phenylethyl, 8-phenyl-4,7-dioxaoctyl, 2-cyanoethyl, 3-cyanopropyl, 4-cyanobutyl, 5-cyano-3-oxapentyl, 6-cyano-4-oxahexyl, 8-cyano-4-oxahexyl, 2-hydroxyethyl, 2- or 3-hydroxypropyl, 2,3-dihydroxypropyl, 2-hydroxybutyl, 4-hydroxybutyl, 5-hydroxy-3-oxapentyl, 6-hydroxy-4-oxahexyl, 8-hydroxy-4-oxaoctyl, 8-hydroxy- 3,6-dioxaoctyl, 2-phenyl-2-hydroxyethyl, 2-chloroethyl, 2-bromoethyl, 2-phenoxyethyl, 3-phenoxypropyl, 4-phenoxybutyl, 5-phenoxy-3-oxapentyl, 6-phenoxy-4-oxahexyl, 8-phenoxy-4-oxaoctyl, 2-cyclohexyloxyethyl, 3-cyclohexyloxypropyl, 4-cyclohexyloxybutyl, 5-cyclohexyloxy-3-oxapentyl, 6-cyclohexyloxy-4-oxahexyl, 8-cyclohexyloxy-4-oxaoctyl, 2-methoxycarbonylethyl, 2-ethoxycarbonylethyl, 3-methoxycarbonylpropyl, 3-ethoxycarbonylpropyl, 4-methoxycarbonylbutyl, 4-ethoxycarbonylbutyl, 5-methoxycarbonyl-3-oxapentyl, 6-methoxycarbonyl-4-oxahexyl, 8-methoxycarbonyl-4-oxaoctyl, 2-phenoxycarbonylethyl, 2- or 3-phenoxycarbonylpropyl, 4-phenoxycarbonylbutyl, 5-phenoxycarbonyl-3-oxapentyl, 6-phenoxycarbonyl-4-oxahexyl, 8-phenoxycarbonyl-4-oxaoctyl, 2-formyloxyethyl, 2-acetyloxyethyl, 2-propionyloxyethyl, 2-butyryloxyethyl, 2-(2-ethylhexanoyloxy)ethyl, 2- or 3-acetyloxypropyl, 2- or 3-propionyloxypropyl, 2- or 3-(2-ethylhexanoyloxy)-propyl, 4-acetyloxybutyl, 4-propionyloxybutyl, 4-(2-ethylhexanoyloxy)-butyl, 5-acetyl-oxy-3-oxapentyl, 5-propionyloxy-3-oxapentyl, 5-(2-ethylhexanoyloxy)-3-oxapentyl, 6-acetyloxy-4-oxahexyl, 6-propionyloxy-4-oxahexyl, 6-(2-ethylhexanoyloxy)-4-oxahexyl, 8-acetyloxy-4-oxaoctyl, 8-propionyloxy-4-oxaoctyl, 8-(2-ethylhexanoyloxy)-4-oxaoctyl, 2-benzoyloxyethyl, 2- or 3-benzoyloxypropyl, 4-benzoyloxybutyl, 5-benzoyloxy-3-oxapentyl, 6-benzoyloxy-4-oxahexyl, 8-benzoyloxy-4-oxaoctyl, cyclopentyl, cyclohexyl, cycloheptyl, phenyl, 2-methylphenyl, 4-methylphenyl, 2,6-dimethylphenyl, 4-isopropylphenyl, 2-methoxyphenyl, 4-methoxyphenyl, 2,4-dimethoxyphenyl, 2-ethoxyphenyl, 2-chlorophenyl, 4-chlorophenyl, 2,4-dichlorophenyl, 4-bromophenyl, allyl or methallyl.

Radicals $B^1$, $B^2$ and $T^2$ are each further for example formyl, acetyl, propionyl, butyryl, isobutyryl, pentanoyl, hexanoyl, heptanoyl, octanoyl or 2-ethylhexanoyl.

Radicals $B^1$ and $B^2$ are each further for example benzoyl, 2-chlorobenzoyl, 4-chlorobenzoyl, 4-bromobenzoyl, 4-methylbenzoyl, 4-methoxybenzoyl, methylsulfonyl, ethylsulfonyl, propylsulfonyl, isopropylsulfonyl, butylsulfonyl, pentylsulfonyl or hexylsulfonyl.

Preference is given to thien-3-ylazo dyes of the formula I where

X is cyano, nitro, $C_1$-$C_2$-alkanoyl, benzoyl or the radical $COOR^1$ where $R^1$ is as defined above, Y is hydrogen, cyano, $C_1$-$C_4$-alkanoyl, phenyl or the radical $COOR^1$ where $R^1$ is as defined above, Z is $C_1$-$C_4$-alkyl, benzyl, phenyl, $C_1$-$C_4$-alkylthio, phenylthio or $C_1$-$C_4$-alkylsulfonyl which may each be substituted by cyano, $C_1$-$C_4$-alkoxycarbonyl, methoxy, chlorine or bromine, or phenylsulfonyl or together with the radical Y is a fused benzo ring which may be substituted, and K is the radical of a coupling component of the 2,6-diaminopyridine, 6-hydroxypyrid-2-one or 5-aminopyrazole series.

Particular preference is given to thien-3-ylazo dyes of the formula I where

X is cyano, $C_1$-$C_4$-alkanoyl or the radical $COOR^1$ where $R^1$ is $C^1$-$C^4$-alkyl or phenyl, Y is hydrogen, cyano, $C_1$-$C_4$-alkanoyl, phenyl or the radical $COOR^1$ where $R^1$ is $C_1$-$C_4$-alkyl or phenyl, Z is $C_1$-$C_4$-alkyl, $C_1$-$C_4$-alkylthio or $C_1$-$C_4$-alkylsulfonyl, which may each be substituted by cyano, $C_1$-$C_4$-alkoxycarbonyl, methoxy, chlorine or bromine, or is benzyl, phenyl, phenylthio or phenylsulfonyl, K is the radical of a coupling component of the 2,6-diaminopyridine, 6-hydroxypyrid-2-one or 5-aminopyrazole series.

There may be mentioned in particular thien-3-ylazo dyes of the formula V, VI or VII

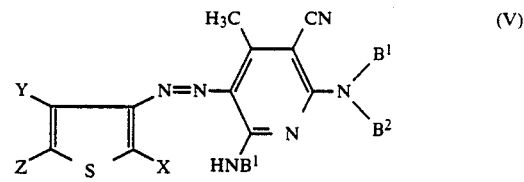 (V)

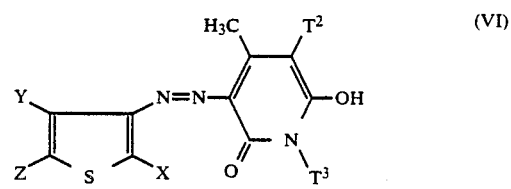 (VI)

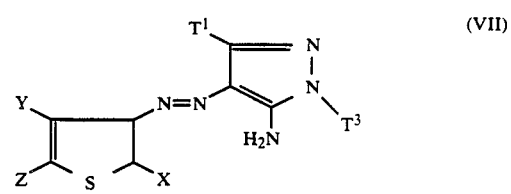 (VII)

where

X is cyano, $C_1$-$C_4$-alkanoyl or the radical $COOR^1$ where $R^1$ is $C_1$-$C_4$-alkyl or phenyl, Y is hydrogen, cyano, $C_1$-$C_4$-alkanoyl, phenyl or the radical $COOR^1$ where $R^1$ is $C_1$-$C_4$-alkyl or phenyl, Z is $C_1$-$C_4$-alkyl or $C_1$-$C_4$-alkylthio, which may each be substituted by cyano, $C_1$-$C_4$-alkoxycarbonyl, methoxy, chlorine or bromine, or is benzyl, phenyl, phenylthio, $C_1$-$C_4$-alkylsulfonyl or phenylsulfonyl, and $T^2$ is hydrogen, cyano, carbamoyl or $C_1$-$C_4$-alkoxycarbonyl and $B^1$, $B^2$, $T^1$ and $T^3$ are each as defined above.

Industrially particularly useful thien-3-ylazo dyes are of the formula V, VI or VII where X is cyano or the radical $COOR^1$ where $R^1$ is $C_1$-$C_4$-alkyl, Y is cyano, phenyl or the radical $COOR^1$ where $R^1$ is $C_1$-$C_4$-alkyl, Z is phenyl or unsubstituted or cyano- or $C_1$-$C_4$-alkoxycarbonyl-substituted $C_1$-$C_4$-alkyl, $T^1$ is hydrogen, methyl or phenyl, $T^2$ is hydrogen, cyano or $C_1$-$C_4$-alkoxycarbonyl and $B^1$, $B^2$ and $T^3$ are each as defined above.

To prepare the thien-3-ylazo dyes of the formula I according to the invention, a conventionally obtainable diazonium compound of an amine of the formula VIII

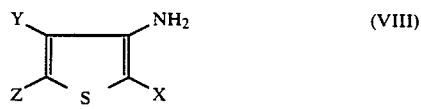 (VIII)

where X, Y and Z are each as defined above, may be reacted with a coupling component HK as described above in a conventional manner.

Further details of the preparation may be found in the examples.

3-Aminothiophenes of the formula VIII are known and described for example in Liebigs Ann. Chem. 656 (1962), 90; Pharm. Zentralhalle 107 (1968), 348; GB-A-2,011,937; or Synthesis 1982, 1056. Further information about ways of synthesizing 3-aminothiophenes is given in Heterocyclic Compounds, vol. 44, John Wiley & Sons, Inc., 1986, Thiophene and its Derivatives, parts 1 and 2.

The dyes according to the invention are yellow to red and are notable for good light fastness, fastness to dry heat setting and pleating and for good affinity. They are suitable for dyeing synthetic fiber materials, such as polyamides, cellulose esters or blends of polyesters and cellulose fibers. But particularly, they are suitable for dyeing synthetic polyesters.

The Examples which now follow serve to illustrate the invention in more detail. Percentages are by weight, unless otherwise stated.

EXAMPLE 1

4.9 g of 3-amino-4-cyano-2-methoxycarbonyl-5-methylthiophene were added to 37.5 ml of 17:3 glacial acetic acid/propionic acid. 10 ml of 85% strength sulfuric acid were added dropwise at 10°-20° C., followed at 0°-5° C. by 4.3 ml of nitrosylsulfuric acid (11.5% of $N_2O_3$), and the mixture was stirred at 0° -5° C. for 4 hours.

The diazonium salt solution prepared above was added dropwise to 6.6 g of 2,6-bis(2-methoxyethylamino)-3-cyano-4-methylpyridine dissolved in 20 ml of N,N-dimethylformamide, 20 ml of dilute hydrochloric acid, 100 g of ice and 0.5 g of sulfamic acid at 0° C. The mixture was stirred at 0°-5° C. for 4 hours, slowly warmed to room temperature and filtered with suction, and the precipitate was washed and dried.

Yield: 10.5 g of the dye of the formula

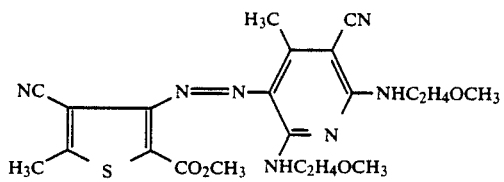

which dyes polyester material in fast orange shades.
$\lambda_{max}(CH_2CL_2)$: 485 nm.

EXAMPLE 2

The diazonium salt solution prepared in Example 1 was added dropwise with stirring to 5.85 g of 3-cyano-6-hydroxy-1-hexyl-4-methylpyrid-2-one dissolved in 20 ml of N,N-dimethylformamide, 20 ml of dilute hydrochloric acid, 100 g of ice and 0.5 g of sulfamic acid at 0° -3° C. After 4 hours at 0° -5° C. and warming to room temperature, the precipitate was filtered off with suction, washed and dried to leave 10.3 g of the dye of the formula

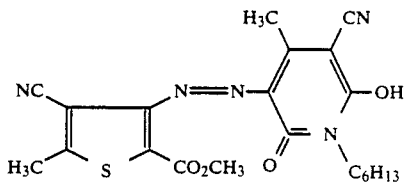

which dyes polyester fiber material in fast yellow shades.
$\lambda_{max}(CH_2CL_2)$: 431 nm.

EXAMPLE 3

4.9 g of 3-amino-2,4-dicyano-5-methylthiothiophene were suspended in 50 ml of 3:1 glacial acetic acid/propionic acid. 8.2 g of nitrosylsulfuric acid (11.5% of $N_2O_3$) were added dropwise at 0°-59° C., and the mixture was stirred at 0° -5° C. for 3 hours.

This diazonium salt solution was added dropwise to 7.7 g of 2,6-bis(3-methoxypropylamino)-3-cyano-4-methylpyridine dissolved in 100 ml of N,N-dimethylformamide, 0.5 g of sulfamic acid and 100 g of ice at 0°-5° C. in the course of 20 minutes. The mixture was stirred at 0°-5° C. for 4 hours and at room temperature for 8 hours. The dye product was filtered off with suction, washed and dried. Yield: 6.2 g of the dye of the formula

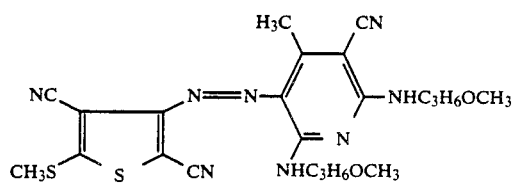

which dyes polyester material in fast orange shades.
$\lambda_{max}(CH_2CL_2)$: 491 nm.

EXAMPLE 4

5.5 g of 3-amino-2-cyano-5-nitrobenzothiophene were diazotized as described in Example 1 and added dropwise to a solution of 6.6 g of 2,6-bis(2-methoxyethylamino)-3-cyano-4-methylpyridine in 20 ml of N,N-dimethylformamide, 100 ml of water, 20 ml of hydrochloric acid, 100 g of ice and 0.5 g of sulfamic acid with stirring at 0°-5° C. Workingup as described in Example 1 left 10.4 g of the dye of the

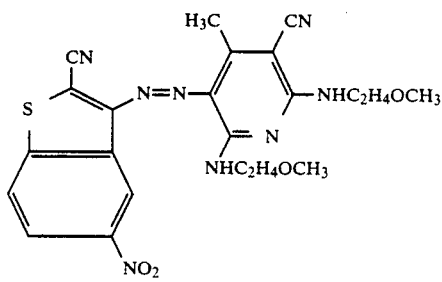

which dyes polyester in fast yellowish red shades.
$\lambda_{max}(CH_2CL_2)$: 506 nm The same method was used to obtain the dyes listed in the following tables 1 to 4:

TABLE 1

[Structure: thiophene-azo dye with substituents X, Y, Z on thiophene; NHR¹, N(R²)(R³), CH₃, CN groups]

| Ex. | X | Y | Z | R¹ | R² | R³ | Hue on PES |
|---|---|---|---|---|---|---|---|
| 5 | CO₂CH₃ | CN | CH₃ | H | C₃H₆OC₄H₈OCOCH₃ | H | orange |
| 6 | CO₂CH₃ | CN | CH₃ | C₂H₅ | C₃H₆OC₄H₈OCOCH₃ | H | orange |
| 7 | CO₂CH₃ | CN | CH₃ | H | C₃H₆OC₂H₄OCOCH₃ | H | orange |
| 8 | CO₂C₂H₅ | CN | CH₃ | H | (1) | H | orange |
| 9 | CO₂C₂H₅ | CN | CH₃ | H | C₃H₆OC₄H₈OCOC₂H₅ | H | orange |
| 10 | CO₂C₂H₅ | CN | CH₃ | H | (2) | H | orange |
| 11 | CO₂CH₃ | CN | C₂H₅ | H | C₃H₆OC₄H₈OCOCH₃ | H | orange |
| 12 | CN | CN | CH₃ | H | (2) | H | orange |
| 13 | CN | CN | CH₃ | H | C₃H₆OC₂H₄OCH₃ | H | orange |
| 14 | COCH₃ | CN | CH₃ | H | C₃H₆OC₂H₄OC₂H₅ | H | orange |
| 15 | COC₆H₅ | CN | CH₃ | H | C₃H₆OC₂H₄OC₄H₉ | H | orange |
| 16 | CO₂C₂H₅ | CN | CH₃ | H | C₃H₆OC₄H₈OC₂H₅ | H | orange |
| 17 | CO₂C₂H₅ | CO₂C₂H₅ | CH₃ | H | C₃H₆OC₄H₈OC₄H₉ | H | orange |
| 18 | CO₂CH₃ | CO₂CH₃ | CH₃ | H | C₃H₆OC₂H₄OC₄H₉ | H | orange |
| 19 | CO₂CH₃ | CO₂CH₃ | C₂H₅ | H | C₃H₆OC₂H₄OCH₃ | H | orange |
| 20 | COCH₃ | CN | CH₃ | H | C₃H₆OC₄H₈OCOCH₃ | H | orange |
| 21 | CO₂CH₃ | CN | CH₃ | C₂H₄OCH₃ | C₃H₆OC₄H₈OH | H | orange |
| 22 | CN | CN | CH₃ | C₂H₄OCH₃ | C₃H₆OC₄H₈OCOCH₃ | H | orange |
| 23 | CO₂C₂H₅ | CN | CH₃ | C₂H₄OCOCH₃ | C₃H₆OC₂H₄OC₂H₅ | H | orange |
| 24 | CO₂C₂H₅ | CN | CH₃ | C₂H₄OH | C₃H₆OC₂H₄OC₂H₅ | H | orange |
| 25 | CO₂CH₃ | CN | C₆H₅ | C₂H₄OCOCH₃ | C₂H₄OC₂H₅ | H | orange |
| 26 | CO₂CH₃ | CN | CH₃ | C₃H₆OCH₃ | C₃H₆OC₂H₄OC₄H₉ | H | orange |
| 27 | CO₂CH₃ | CN | CH₃ | C₃H₆OCH₃ | C₃H₆OC₄H₈OH | H | orange |
| 28 | CO₂CH₃ | H | CH₃ | C₃H₆OCH₃ | C₃H₆OC₄H₈OH | H | orange |
| 29 | CO₂CH₃ | H | CH₃ | H | C₃H₆OC₂H₄OCH₃ | H | orange |
| 30 | CO₂CH₃ | CN | CH₃ | C₃H₆OCOCH₃ | C₆H₅ (phenyl) | H | yellowish red |
| 31 | CO₂CH₃ | CN | CH₃ | phenyl | C₃H₆OCOCH₃ | H | yellowish red |
| 32 | CN | CN | CH₃ | 2-methoxyphenyl | C₃H₆OCOCH₃ | H | red |
| 33 | CO₂CH₃ | CN | CH₃ | C₃H₆OC₄H₈OH | 2-methoxyphenyl | H | orange |
| 34 | CO₂C₂H₅ | CN | CH₃ | C₃H₆OH | phenyl | H | yellowish red |
| 35 | CO₂C₂H₅ | CN | CH₃ | C₃H₆OH | 4-methoxyphenyl | H | red |
| 36 | CO₂C₂H₅ | CN | CH₃ | C₃H₆OC₂H₄OCH₃ | 4-methoxyphenyl | H | red |

TABLE 1-continued

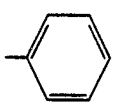

| Ex. | X | Y | Z | R¹ | R² | R³ | Hue on PES |
|---|---|---|---|---|---|---|---|
| 37 | $CO_2CH_3$ | $CO_2CH_3$ | $C_2H_5$ | $C_3H_6OCH_3$ | $C_3H_6OCH_3$ | H | orange |
| 38 | $CO_2C_2H_5$ | CN | $C_4H_9$ | $C_2H_4OCH_3$ | $C_2H_4OCH_3$ | H | orange |
| 39 | $COCH_3$ | CN | $CH_3$ | $C_2H_5$ | $C_3H_6OC_4H_8OCOC_2H_5$ | H | orange |
| 40 | $COC_6H_5$ | CN | $CH_3$ | $C_2H_5$ | $C_3H_6OC_2H_4OC_4H_9$ | H | orange |
| 41 | $CO_2CH_3$ | CN | $CH_3$ | $C_2H_5$ | $C_3H_6OC_2H_4OH$ | H | orange |
| 42 | $CO_2CH_3$ | H | $CH_3$ | $C_3H_6OH$ | 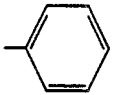 | H | yellowish red |
| 43 | $CO_2C_2H_5$ | CN | $CH_3$ | $C_3H_6OCOCH_3$ | 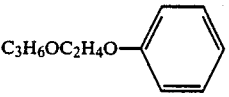 | H | yellowish red |
| 44 | $CO_2CH_3$ | CN | $CH_3$ | H | $C_3H_6OC_4H_8OC_4H_9$ | H | orange |
| 45 | $COCH_3$ | CN | $CH_3$ | $C_3H_6OCH_3$ | $C_3H_6OCH_3$ | H | orange |
| 46 | $CO_2C_2H_5$ | CN | $CH_3$ | $C_3H_6OCH_3$ | $C_3H_6OC_4H_8OC_4H_9$ | H | orange |
| 47 | CN | CN | $CH_3$ | H | $C_3H_6OC_2H_4O$—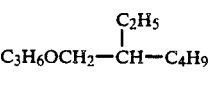 | H | orange |
| 48 | CN | CN | $CH_3$ | H | $C_3H_6OCH_2$—CH($C_2H_5$)—$C_4H_9$ | H | orange |
| 49 | $CO_2CH_3$ | CN | $CH_3$ | H | 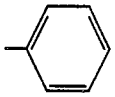 | H | orange |
| 50 | $CO_2CH_3$ | CN | $CH_3$ | H | 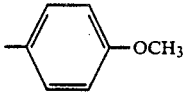—$OCH_3$ | H | reddish orange |
| 51 | $CO_2CH_3$ | CN | $CH_3$ | H | $C_3H_6OC_4H_8OCOC_2H_5$ | H | orange |
| 52 | $CO_2CH_3$ | CN | $CH_3$ | $C_2H_4OCH_3$ | $C_2H_4OCH_3$ | $CH_3$ | reddish orange |
| 53 | $CO_2CH_3$ | CN | $CH_3$ | $C_3H_6OCH_3$ | $C_2H_5$ | $C_2H_5$ | reddish orange |
| 54 | CN | CN | $SCH_3$ | H | $C_3H_6OC_4H_8OCOCH_3$ | H | orange |
| 55 | CN | CN | $SCH_3$ | $C_2H_4OCH_3$ | $C_3H_6OC_4H_8OH$ | H | orange |
| 56 | CN | CN | $SCH_3$ | $C_2H_4OCH_3$ | $C_2H_4OCH_3$ | H | orange |
| 57 | CN | CN | $SCH_3$ | H | $C_3H_6OC_4H_8OC_2H_5$ | H | orange |
| 58 | $CO_2CH_3$ | CN | (3) | H | $C_3H_6OC_4H_8C_2H_5$ | H | orange |
| 59 | $CO_2CH_3$ | CN | (3) | $C_2H_4OCH_3$ | $C_2H_4OCH_3$ | H | orange |
| 60 | $CO_2CH_3$ | $C_6H_5$ | (3) | H | $C_3H_6OC_2H_4OCH_3$ | H | orange |
| 61 | $NO_2$ | CN | $SCH_3$ | $C_2H_4OCH_3$ | $C_2H_4OCH_3$ | H | reddish orange |
| 62 | CN | CN | $SO_2CH_3$ | $C_2H_4OCH_3$ | $C_2H_4OCH_3$ | H | orange |
| 63 | $CO_2CH_3$ | CN | $SCH_3$ | H | $C_3H_4OC_4H_8OC_2H_5$ | H | orange |
| 64 | $CO_2CH_3$ | CN | $SCH_3$ | $C_2H_4OH$ | $C_3H_6OC_4H_8OH$ | H | orange |

(1) $C_3H_6OC_2H_4O$—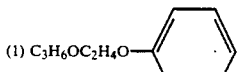

(2) $C_3H_6OC_4H_8OCOCH_2CH(CH_3)_2$

TABLE 2

[Structure diagram: pyridone-thiophene azo dye with substituents H3C, W, Y, Z, X, R, OH]

| Ex. | X | Y | Z | R | W | Hue on PES |
|-----|---|---|---|---|---|------------|
| 65 | CO2CH3 | CN | CH3 | CH3 | CN | yellow |
| 66 | CO2CH3 | CN | CH3 | C4H9 | CN | yellow |
| 67 | CO2CH3 | CN | CH3 | C3H6OCH2—C6H5 | CN | yellow |
| 68 | CO2CH3 | CN | CH3 | C3H6OC2H4OC6H5 | CN | yellow |
| 69 | CN | CN | CH3 | C6H13 | CN | yellow |
| 70 | CN | CN | CH3 | C3H6O—C6H11 | CN | yellow |
| 71 | CN | CN | CH3 | C3H7 | CN | yellow |
| 72 | COCH3 | CN | CH3 | CH2CH(C2H5)C4H9 | CN | yellow |
| 73 | COCH3 | CN | CH3 | CH3 | CN | yellow |
| 74 | COCH3 | CN | CH3 | C3H6OCH2—C6H5 | CN | yellow |
| 75 | COC6H5 | CN | CH3 | C3H6OCH2—C6H5 | CN | yellow |
| 76 | COC6H5 | CN | CH3 | C4H9 | CN | yellow |
| 77 | CO2C2H5 | CN | CH3 | CH3 | CN | yellow |
| 78 | CO2C2H5 | CO2C2H5 | CH3 | CH3 | CN | yellow |
| 79 | CO2CH3 | H | CH3 | C4H9 | CN | yellow |
| 80 | CO2CH3 | CO2CH3 | CH3 | C3H6O—C6H11 | CN | yellow |
| 81 | CO2CH3 | CN | CH3 | CH3 | CONH2 | yellow |
| 82 | CO2CH3 | CN | CH3 | CH2CH(C2H5)C4H9 | CONH2 | yellow |
| 83 | CO2CH3 | CN | CH3 | C3H78 | CONHC3H7 | yellow |
| 84 | CO2CH3 | CN | CH3 | C3H6OC2H9OC6H5 | H | yellow |
| 85 | CO2CH3 | CN | CH3 | C4H9 | CO2C2H5 | yellow |
| 86 | CO2C2H5 | CN | CH3 | C6H13 | CONH2 | yellow |
| 87 | CN | CN | CH3 | C6H13 | CONH2 | yellow |
| 88 | CN | CN | SCH3 | CH3 | CN | yellow |
| 89 | CN | CN | SCH3 | C3H6OCH2C6H5 | CN | yellow |
| 90 | CN | CN | SCH3 | C4H9 | CN | yellow |
| 91 | CO2CH3 | CN | SCH2CO2CH3 | C4H9 | CN | yellow |
| 92 | CO2CH3 | C6H5 | SCH2CO2CH3 | C4H9 | CN | yellow |
| 93 | CO2CH3 | CN | SCH3 | C3H6OC2H4OC6H5 | CN | yellow |

(3) SCH2CO2CH3

TABLE 3

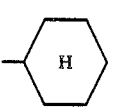

| Ex. | X | Y | Z | T¹ | T³ | Hue on PES |
|---|---|---|---|---|---|---|
| 94 | CO$_2$CH$_3$ | CN | CH$_3$ | H | CH$_2$C$_6$H$_5$ | yellow |
| 95 | CO$_2$CH$_3$ | CN | CH$_3$ | H | C$_6$H$_5$ | yellow |
| 96 | CO$_2$CH$_3$ | CN | CH$_3$ | H | cyclohexyl-H | yellow |
| 97 | CO$_2$CH$_3$ | CN | CH$_3$ | CH$_3$ | C$_6$H$_5$ | yellow |
| 98 | CO$_2$C$_2$H$_5$ | CN | CH$_3$ | H | CH$_2$C$_6$H$_5$ | yellow |
| 99 | CO$_2$C$_2$H$_5$ | CN | CH$_3$ | H | CH$_3$ | yellow |
| 100 | COCH$_3$ | CN | CH$_3$ | H | C$_6$H$_5$ | yellow |
| 101 | CN | CN | CH$_3$ | H | cyclohexyl-H | yellow |
| 102 | CO$_2$CH$_3$ | CO$_2$CH$_3$ | CH$_3$ | H | CH$_2$C$_6$H$_5$ | yellow |
| 103 | CO$_2$CH$_3$ | CO$_2$CH$_3$ | C$_2$H$_5$ | H | CH$_2$C$_6$H$_5$ | yellow |
| 104 | CO$_2$CH$_3$ | H | CH$_3$ | H | C$_6$H$_5$ | yellow |
| 105 | COC$_6$H$_5$ | CN | CH$_3$ | H | cyclohexyl-H | yellow |
| 106 | CN | CN | SCH$_3$ | H | cyclohexyl-H | yellow |
| 107 | CN | CN | SCH$_3$ | H | CH$_2$C$_6$H$_5$ | yellow |
| 108 | CO$_2$CH$_3$ | CN | SCH$_2$CO$_2$CH$_3$ | H | CH$_2$C$_6$H$_5$ | yellow |
| 109 | CO$_2$CH$_3$ | CN | SCH$_3$ | H | C$_6$H$_5$ | yellow |
| 110 | CO$_2$CH$_3$ | C$_6$H$_5$ | SCH$_2$CO$_2$CH$_3$ | H | cyclohexyl-H | yellow |

TABLE 4

D—N=N—K

| Ex. | D | K | Hue on PES |
|---|---|---|---|
| 111 | 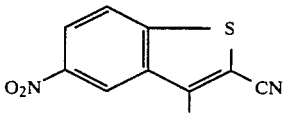 | 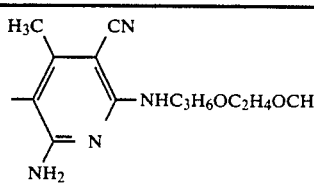 | yellowish red |

TABLE 4-continued

D—N=N—K

| Ex. | D | K | Hue on PES |
|---|---|---|---|
| 112 | 2-CN, 3-methyl-5-nitrobenzo[b]thiophene | 3-CN, 4-methyl, 5-methyl, 6-NHC₂H₄OCH₃, 2-NHC₃H₆OC₄H₈OCOCH₃ pyridine | yellowish red |
| 113 | 2-CN, 3-methyl-5-nitrobenzo[b]thiophene | 3-CN, 4-methyl, 5-methyl, 6-NHC₃H₆OCH₃, 2-NHC₃H₆OC₄H₈OH pyridine | yellowish red |
| 114 | 2-CN, 3-methyl-5-nitrobenzo[b]thiophene | 3-CN, 4-methyl, 5-methyl, 6-NH₂, 2-NHC₃H₆OCH₂CH(C₂H₅)C₄H₉ pyridine | yellowish red |
| 115 | 2-CN, 3-methyl-5-nitrobenzo[b]thiophene | 3-CN, 4-methyl, 5-methyl, 2-OH, N-CH₃, 6-oxo pyridone | yellow |
| 116 | 2-CN, 3-methyl-5-nitrobenzo[b]thiophene | 3-CN, 4-methyl, 5-methyl, 2-OH, N-C₄H₉, 6-oxo pyridone | yellow |
| 117 | 2-CN, 3-methyl-5-nitrobenzo[b]thiophene | 3-CN, 4-methyl, 5-methyl, 2-OH, N-C₃H₆O-cyclohexyl, 6-oxo pyridone | yellow |
| 118 | 2-CN, 3-methyl-5-nitrobenzo[b]thiophene | 5-amino-1-benzyl-pyrazole | yellow |
| 119 | 2-CN, 3-methyl-5-nitrobenzo[b]thiophene | 5-amino-1-methyl-pyrazole | yellow |

TABLE 4-continued

D—N=N—K

| Ex. | D | K | Hue on PES |
|---|---|---|---|
| 120 | 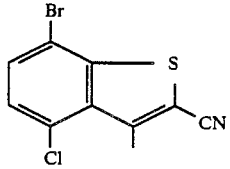 | 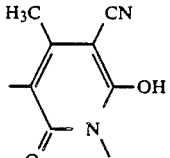 | yellow |
| 121 | 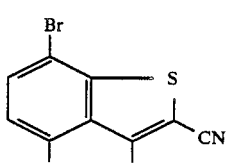 | 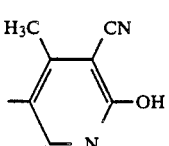 | yellow |
| 122 | 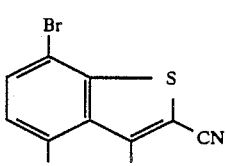 | 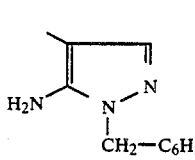 | yellow |
| 123 | 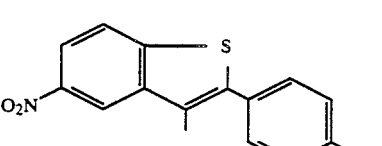 | 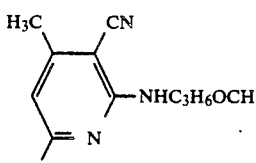 | yellowish red |

We claim:

1. A thien-3-ylazo dye of the formula I

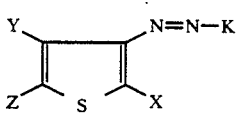

where

X is cyano, $C_1$–$C_6$-alkanoyl, substituted or unsubstituted benzoyl, substituted or unsubstituted phenyl or the radical $COOR^1$ or $CONR^1R^2$ where $R^1$ and $R^2$ are identical or different and each is independently of each other, substituted or unsubstituted $C_1$–$C_8$-alkyl, $C_5$–$C_7$-cycloalkyl, $C_3$–$C_4$-alkenyl, substituted or unsubstituted phenyl or together with the nitrogen atom linking them a member selected from the group consisting of pyrrolidino, piperidino, morpholino, piperazino and N-($C_1$–$C_4$-alkyl)piperazino, and $R^2$ may additionally be hydrogen, Y is hydrogen, cyano, $C_1$–$C_6$-alkanoyl, substituted or unsubstituted benzoyl, substituted or unsubstituted phenyl or the radical $COOR^1$ or $CONR^1R^2$ where $R^1$ and $R^2$ are each as defined above, Z is hydrogen, substituted or unsubstituted $C_1$–$C_8$-alkyl, substituted or unsubstituted $C_1$–$C_6$-alkylthio, substituted or unsubstituted phenyl, substituted or unsubstituted phenylthio or substituted or unsubstituted $C_1$–$C_6$-alkylsulfonyl or phenylsulfonyl and K is a group of the formula (II)

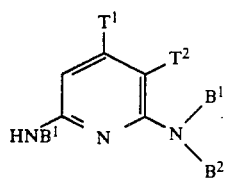

where $B^1$ and $B^2$ are identical or different and each is independently of the other hydrogen, unsubstituted or substituted $C_1$–$C_{12}$-alkyl, substituted or unsubstituted $C_3$–$C_{12}$-alkoxyalkoxyalkyl or $C_2$–$C_{12}$-alkoxyalkyl, $C_5$–$C_7$-cycloalkyl, substituted or unsubstituted phenyl, $C_3$–$C_6$-alkenyl, substituted or unsubstituted benzoyl, $C_1$–$C_8$-alkanoyl, $C_1$–$C_6$-alkylsulfonyl or phenylsulfonyl, $T^1$ is hydrogen, $C_1$–$C_4$-alkyl or phenyl, $T^2$ is hydrogen, cyano, nitro, carbemoyl, $C_1$–$C_4$-monoalkyl- or dialkyl-carbamoyl, $C_1$–$C_8$-alkanoyl, $C_1$–$C_6$-alkanoyl, $C_2$–$C_6$-alkoxycarbonyl or $C_3$–$C_6$-alkoxyalkoxyalkoxycarbonyl, and the substituents on substituted alkyl, alkylthio, alkoxyalkyl, alkoxyalkoxyalkyl or alkylsulfonyl values of X, Y and Z are selected from the group consisting of hydroxy, $C_1$–$C_4$-alkoxy, phenoxy, $C_1$–$C_4$-alkoxycarbonyl, cyano and phenyl, the substituents on substituted benzoyl, phenyl, phenylthio and phenylsulfonyl values of X, Y, Z, $B^1$ and $B^2$ are selected from the group consisting of $C_1$–$C_4$-alkyl, $C_1$–$C_4$-alkoxy, cyano, fluoro, chloro, bromo and nitro, and the substituents on substituted alkyl, alkoxyalkoxyalkyl and alkoxyalkyl values of $B^1$ and $B^2$ are phenyl, cyano, $C_1$–$C_8$-alkoxycarbonyl, phenoxycarbonyl, halogen, hydroxyl, $C_1$–$C_8$-alkanoyloxy, benzoyloxy, $C_5$–$C_7$-cycloalkoxy and phenoxy.
2. The compound of claim 1 having the formula:
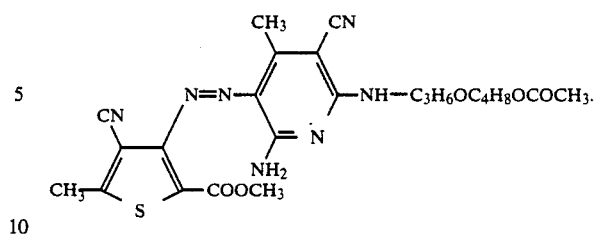
3. The compound of claim 1 having the formula:
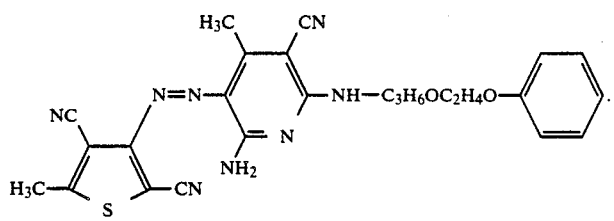
4. The compound of claim 1 having the formula:
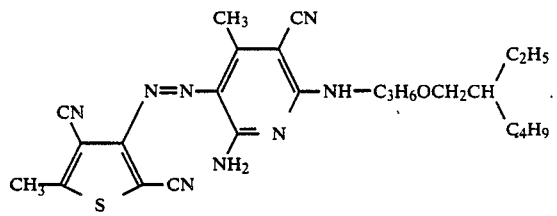
* * * * *